United States Patent
Carbone et al.

(10) Patent No.: US 11,044,145 B2
(45) Date of Patent: Jun. 22, 2021

(54) CONFIGURING AND NAMING OF CLOUD PROVISIONING ENTITIES

(71) Applicant: International Business Machines Corporation, Armonk, NY (US)

(72) Inventors: Nicholas Carbone, Poughkeepsie, NY (US); John L. Czukkermann, LaGrangeville, NY (US); Michael D. Essenmacher, Danbury, CT (US); Kirsten B. McDonald, Poughkeepsie, NY (US); Gary S. Puchkoff, Poughkeepsie, NY (US); Donald W. Schmidt, Stone Ridge, NY (US); Hiren R. Shah, Highland, NY (US); Brad D. Stilwell, Poughkeepsie, NY (US); Andrew P. Wack, Millbrook, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 715 days.

(21) Appl. No.: 15/377,427

(22) Filed: Dec. 13, 2016

(65) Prior Publication Data

US 2018/0167270 A1 Jun. 14, 2018

(51) Int. Cl.
*G06F 15/177* (2006.01)
*H04L 12/24* (2006.01)

(52) U.S. Cl.
CPC ................ *H04L 41/0803* (2013.01)

(58) Field of Classification Search
CPC .... H04L 41/0803; H04L 63/10; H04L 63/104
See application file for complete search history.

(56) References Cited

U.S. PATENT DOCUMENTS

| | | | |
|---|---|---|---|
| 5,446,903 | A | 8/1995 | Abraham et al. |
| 5,790,789 | A | 8/1998 | Suarez |
| 6,854,016 | B1 | 2/2005 | Kraenzel et al. |
| 6,880,129 | B1 | 4/2005 | Lee et al. |
| 7,054,924 | B1 | 5/2006 | Harvey et al. |
| 7,200,805 | B2 | 4/2007 | Carlson et al. |
| 7,603,443 | B2 | 10/2009 | Fong et al. |
| 7,673,328 | B1 | 3/2010 | Kojima |
| 8,010,899 | B2 | 8/2011 | Choi |
| 8,122,063 | B2 | 2/2012 | Kraft et al. |
| 8,200,715 | B1 | 6/2012 | Kraft et al. |
| 8,266,616 | B1 | 9/2012 | Jacquot et al. |
| 8,677,318 | B2 | 3/2014 | Mohindra et al. |

(Continued)

OTHER PUBLICATIONS

Buzzetti et al., "Determining Identities for Executing Cloud Processing and Approvers of the Executing," U.S. Appl. No. 15/377,354, filed Dec. 13, 2016.

(Continued)

*Primary Examiner* — Yves Dalencourt
(74) *Attorney, Agent, or Firm* — Cantor Colburn LLP; Teddi Maranzano

(57) ABSTRACT

A method includes configuring, by a cloud provisioning server, a first cloud domain. The first cloud domain and a second cloud domain use at least one of the same operating system and the same system resource pool. The method also includes configuring a tenant within the first cloud domain. The tenant is isolated from tenants of the second cloud domain. Resources used by the configured tenant are not shared with tenants of the second cloud domain.

14 Claims, 7 Drawing Sheets

(56) References Cited

U.S. PATENT DOCUMENTS

| | | |
|---|---|---|
| 8,706,776 B1 | 4/2014 | Kraft et al. |
| 8,874,755 B1 | 10/2014 | Deklich et al. |
| 9,069,979 B2 * | 6/2015 | Srinivasan .............. G06F 21/62 |
| 9,276,942 B2 | 3/2016 | Srinivasan et al. |
| 9,330,161 B2 | 5/2016 | D'Amato et al. |
| 2004/0083453 A1 | 4/2004 | Knight et al. |
| 2005/0271050 A1* | 12/2005 | Akgun .............. H04L 29/12009 370/389 |
| 2007/0157317 A1 | 7/2007 | Venkatachalam et al. |
| 2008/0189206 A1 | 8/2008 | Choi |
| 2008/0301672 A1 | 12/2008 | Rao et al. |
| 2010/0125612 A1 | 5/2010 | Amradkar et al. |
| 2011/0320605 A1 | 12/2011 | Kramer |
| 2013/0091547 A1* | 4/2013 | Venkatesh ................. G06F 7/00 726/4 |
| 2013/0185431 A1 | 7/2013 | Venkatesh |
| 2014/0047319 A1 | 2/2014 | Eberlein |
| 2014/0074973 A1 | 3/2014 | Kumar et al. |
| 2014/0075021 A1 | 3/2014 | Revanuru |
| 2014/0075565 A1* | 3/2014 | Srinivasan ....... G06Q 10/06315 726/26 |
| 2015/0156218 A1 | 6/2015 | Arun et al. |
| 2015/0278397 A1 | 10/2015 | Hendrickson et al. |
| 2015/0295862 A1 | 10/2015 | Banergee et al. |
| 2016/0094483 A1 | 3/2016 | Johnston et al. |
| 2016/0105393 A1 | 4/2016 | Thakkar et al. |
| 2016/0132805 A1 | 5/2016 | Delacourt et al. |
| 2016/0132808 A1 | 5/2016 | To et al. |
| 2016/0182525 A1 | 6/2016 | Zhu et al. |
| 2016/0191411 A1 | 6/2016 | Kim et al. |
| 2016/0212012 A1 | 7/2016 | Young et al. |
| 2016/0323183 A1 | 11/2016 | Jeuk |
| 2016/0330288 A1* | 11/2016 | Hoffman ................. H04L 67/10 |
| 2017/0070500 A1 | 3/2017 | Hockey et al. |
| 2017/0140405 A1 | 5/2017 | Gottemukkala et al. |
| 2017/0169339 A1 | 6/2017 | Dalmia et al. |
| 2017/0171146 A1* | 6/2017 | Sharma ............... H04L 61/1511 |
| 2017/0180346 A1 | 6/2017 | Suarez et al. |
| 2017/0220448 A1 | 8/2017 | Topiwala et al. |
| 2017/0364345 A1 | 12/2017 | Fontoura et al. |
| 2018/0032399 A1 | 2/2018 | Johnson et al. |
| 2018/0039494 A1 | 2/2018 | Lander |
| 2018/0129665 A1 | 5/2018 | Bach |
| 2018/0137139 A1 | 5/2018 | Bangalore et al. |
| 2018/0150377 A1 | 5/2018 | Oberle |
| 2019/0065575 A1* | 2/2019 | Dixon ................. G06F 11/3065 |

OTHER PUBLICATIONS

Carbone et al., "Generating and Managing Names of Instances," U.S. Appl. No. 15/377,410, filed Dec. 13, 2016.

Carbone et al., "Performing Actions That Have Been Defined for Provisioned Instances," U.S. Appl. No. 15/377,398, filed Dec. 13, 2016.

List of IBM Patents or Patent Applications Treated As Related; Date Filed: Dec. 13, 2016, 2 pages.

Bertino et al. "Securing XML documents with Author-X." IEEE Internet Computing, vol. 5, Issue 3, May 2001, p. 21-31.

Gao, "Study on the Expended-Enterprise Information Portal Based on the Role Control Theory", Applied Mechanics and Materials, vols. 40-41, pp. 631-636, 2011 (Abstract only).

* cited by examiner

CONFIGURING AND NAMING OF CLOUD PROVISIONING ENTITIES

BACKGROUND

An embodiment relates in general to configuring and naming of computing entities. More specifically, an embodiment relates to configuring and naming of cloud provisioning entities.

"Provisioning" generally relates to a configuring, managing, and providing of software and/or computing services. In the context of a cloud provisioning environment, a cloud provisioning server can configure, provide, and manage software and/or computing services that are allocated to an end user. Software and services are provisioned to end users by providing the end users with instantiations ("instances") of the software and services.

SUMMARY

According to one or more embodiments, a method includes configuring, by a cloud provisioning server, a first cloud domain. The first cloud domain and a second cloud domain use at least one of a same operating system and a same system resource pool. The method also includes configuring a tenant within the first cloud domain. The tenant is isolated from tenants of the second cloud domain, and resources used by the configured tenant are not shared with tenants of the second cloud domain.

According to one or more embodiments, a computer system includes a memory. The computer system also includes a processor system communicatively coupled to the memory. The processor system is configured to perform a method including configuring a first cloud domain. The first cloud domain and a second cloud domain use at least one of a same operating system and a same system resource pool. The method also includes configuring a tenant within the first cloud domain. The tenant is isolated from tenants of the second cloud domain, and resources used by the configured tenant are not shared with tenants of the second cloud domain.

According to one or more embodiments, a computer program product including a computer-readable storage medium is provided. The computer-readable storage medium has program instructions embodied therewith. The computer-readable storage medium is not a transitory signal per se, the program instructions readable by a processor system to cause the processor system to perform a method. The method includes configuring, by a cloud provisioning server, a first cloud domain. The first cloud domain and a second cloud domain use at least one of a same operating system and a same system resource pool. The method also includes configuring a tenant within the first cloud domain. The tenant is isolated from tenants of the second cloud domain, and resources used by the configured tenant are not shared with tenants of the second cloud domain.

BRIEF DESCRIPTION OF THE DRAWINGS

The subject matter of one or more embodiments is particularly pointed out and distinctly defined in the claims at the conclusion of the specification. The foregoing and other features and advantages are apparent from the following detailed description taken in conjunction with the accompanying drawings in which:

DETAILED DESCRIPTION

Figure 1:
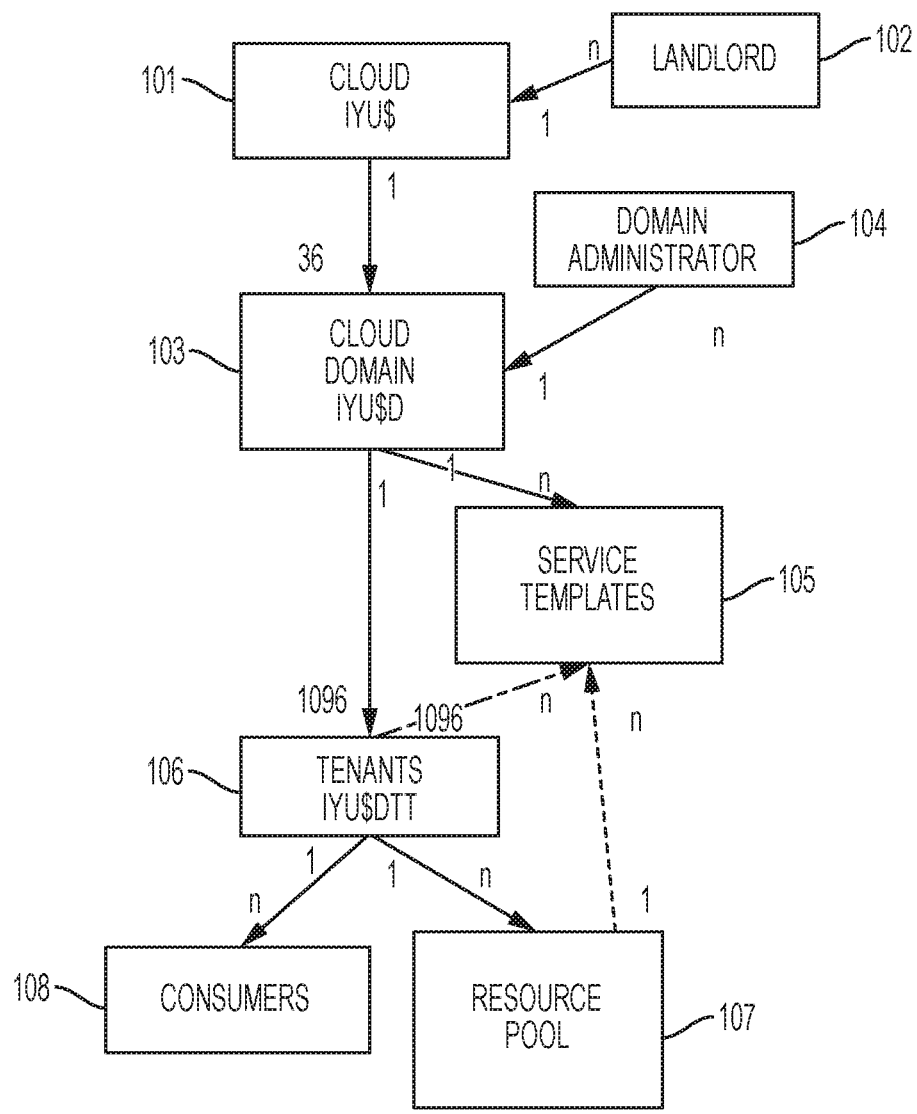
FIG. 1 depicts cloud provisioning entities, in accordance with an embodiment.

One or more embodiments can include methods and computer program products for configuring and naming of cloud provisioning entities. Various embodiments are described herein with reference to the related drawings. Alternative embodiments can be devised without departing from the scope of this invention. References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Additionally, although this disclosure includes a detailed description of a computing device configuration, implementation of the teachings recited herein are not limited to a particular type or configuration of computing device(s). Rather, embodiments of the present disclosure are capable of being implemented in conjunction with any other type or configuration of wireless or non-wireless computing devices and/or computing environments, now known or later developed.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

For the sake of brevity, conventional techniques related to computer processing systems and computing models may or may not be described in detail herein. Moreover, it is understood that the various tasks and process steps described herein can be incorporated into a more comprehensive procedure, process or system having additional steps or functionality not described in detail herein.

It is also understood in advance that although this disclosure includes a detailed description on cloud computing, implementation of the teachings recited herein are not limited to a cloud computing environment. Rather, one or more embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

With one or more embodiments, a cloud provider can perform pooling of computing resources, and the cloud provider can serve multiple consumers/users with the pooled computing resources. For example, multiple consumers/users can be served in accordance with a multi-tenant model, where each consumer/user can correspond to a tenant. The cloud provider may choose to isolate certain tenants to specific resource pools, or the cloud provider may build an Infrastructure as a Service (IaaS) infrastructure in order configure multiple tenants as using a same resource pool.

With the current approaches of implementing cloud environments, in order for a cloud provider to provide services to a customer, the cloud provider provides the customer with a partition of memory/hardware (i.e., resources) that is specifically dedicated to the customer, where only the customer can access this dedicated partition of memory/hardware. Next, the cloud provider installs an operating system on the dedicated partition for the customer. If other customers have their own dedicated partitions, then the cloud provider separately installs operating systems on the other dedicated partitions for these other customers. Next, after the cloud provider installs the operating system for the customer, the cloud provider can execute instances of services for the customer. As such, because customers are isolated from each other due to their separate partitions of hardware, the current approaches implement isolation between customers at the hardware level.

In contrast to the current approaches, one or more embodiments can implement isolation between customers at a different level, such as at the operating system level, for example. For example, an embodiment provides a method where different customers/tenants can use a shared hardware and a shared operating system. The shared operating system can implement isolation between customers/tenants, as described in more detail below.

An embodiment enables a cloud provider to run/implement multiple disparate instances for different tenants/customers, with different service levels for those instances, with a high level of isolation among the implemented instances. In view of the above, one or more embodiments enable automatic provisioning of instances for multiple consumers/tenants and their workloads. Embodiments can use a single instance or a pool of instances.

In the multi-tenancy model of one or more embodiments, multiple tenants can use the same operating system or the same pool of system resources, while still preserving the necessary isolation between tenants. For example, although multiple tenants can use resources from the same pool of system resources, the specific resources that are used by each tenant may or may not be shared by other tenants, depending upon whether isolation between tenants is necessary. In order to provide a multi-tenancy model within a cloud environment, one or more embodiments define new cloud entities. One or more embodiments are directed to a method for organizing/managing the new cloud entities that need to be defined, and a method for organizing/managing their relationships, in order to easily manage and recognize these entities.

FIG. 1 depicts cloud provisioning entities, in accordance with one or more embodiments. In order to implement a multi-tenancy model, embodiments can configure cloud entities including, for example, a cloud 101, a landlord 102, a cloud domain 103, a domain administrator 104, a service template 105, a tenant 106, a resource pool 107, and/or a service consumer/user 108.

An embodiment also defines corresponding hierarchical relationships, in order to provide granular isolation of system resources and sharing capabilities, as further described in more detail below. Referring to the example of FIG. 1, a landlord can organize/manage different clouds, such as cloud IYU$, for example. A "landlord" can generally be considered to be an entity that defines a high-level cloud scope, defines associated system resources, and defines cloud domains.

One or more embodiments can configure different domains for cloud IYU$, such as cloud domain IYU$D, for example. A domain administrator can organize/manage cloud domain IYU$D. A "domain administrator" can generally be considered to be an entity that manages a domain. The domain administrator of a specific domain is responsible for defining the services, tenants, and resource pools for the domain. The domain administrator can manage the relationships across tenants, services, and resource pools.

An embodiment can also be directed to a method of automatically naming the above-described cloud entities by generating unique names for each cloud entity. Embodiments can also dynamically configure security and can configure authorization of the relevant hierarchical relationships between landlord, domain, and tenant.

As embodiments can support multiple cloud domains, with multiple tenants within each cloud domain, embodiments can configure a naming scheme for domain and tenant identifiers. A "domain" can generally be a partitioned management scope for tenants, services, and resource pools, where the management scope can be partitioned into functional groups, as described in more detail below. A "tenant" can generally be a scope that shares certain resources. A tenant can include a consumer or a group of consumers that have been granted use of specified services and associated resources in a domain, as described in more detail below. The domain administrator of a specific cloud domain can define and manage the tenants of the specific cloud domain.

The naming scheme for domain and tenant identifiers can be used to control the domain-tenant relationship. The format of the domain and tenant identifiers can be configured such that the tenants within a domain can be identified as belonging to the domain, due to the format of the tenant identifier for each tenant. For example, referring again to the example of FIG. 1, a cloud is identified as "IYU$." Cloud domains which are implemented within cloud "IYU$" can use identifier "IYU$" as a cloud domain identifier. For example, cloud domains can use the cloud identifier "IYU$" as a prefix, where the complete name of the cloud domain will be "IYU$D," where the "D" can correspond to one of the digits [0 . . . 9 and A . . . Z]. With a digit ranging from [0 . . . 9 and A . . . Z], a landlord can define up to 36 cloud domains. Each cloud domain can be assigned a different digit, thus uniquely identifying each cloud domain within cloud IYU$. One or more domain administrators can be assigned to each cloud domain.

As a cloud domain can be identified as "IYU$D," tenants which belong to this cloud domain can use cloud domain identifier "IYU$D" within their corresponding tenant identifiers. For example, tenants can use the cloud domain identifier as a prefix, where the complete name of the tenant will be "IYU$DTT," where each T can correspond to one of the digits [0 . . . 9 and A . . . Z]. Each tenant can be assigned a different set of digits, thus uniquely identifying each tenant within cloud domain IYU$D.

By naming entities to reflect their hierarchical relationships, and by naming entities such that they can be uniquely identified, embodiments can generate names such that there are no name collisions. Embodiments can also name service instances (that are provisioned based upon service templates) based upon a resource pool that is used, where such a naming of the service instances can allow the service instances to also be uniquely named.

In addition to using the above-described naming method, embodiments can support existing customer naming conventions, where embodiments can transform the existing manual middleware configuration setup to be implemented as a middleware cloud service. By generating names automatically, consumers/end users do not have to be concerned about name collisions nor be concerned about maintaining the allocated names.

Figure 2:
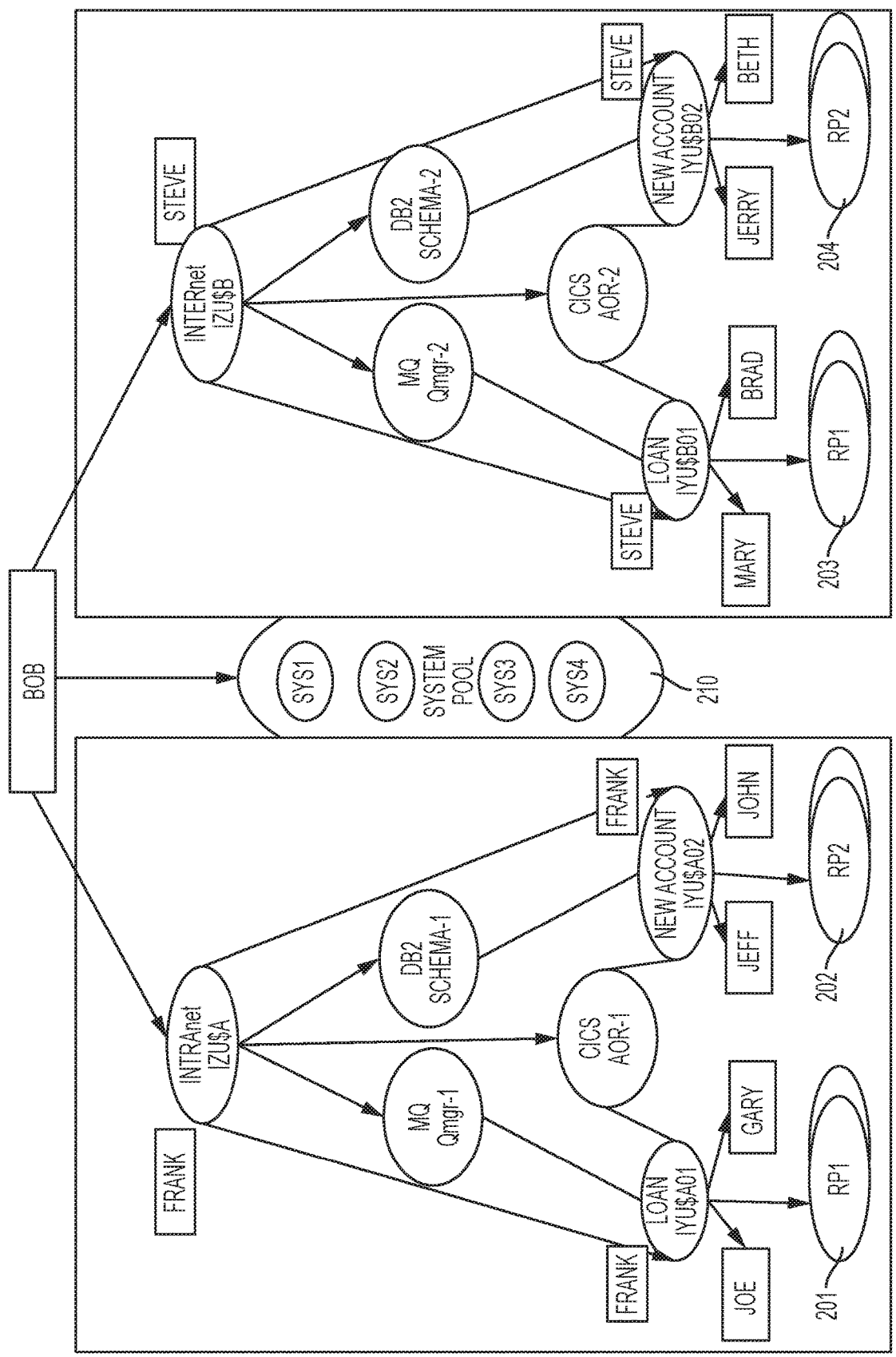
FIG. 2 depicts a hierarchy of cloud provisioning entities, in accordance with an embodiment.

FIG. 2 depicts a hierarchy of cloud provisioning entities, in accordance with one or more embodiments. Referring to FIG. 2, an entity named "BOB" has been configured as a landlord. As shown by system pool 210, the landlord can be in control of multiple operating systems within a system pool 210. Each cloud domain is implemented on an operating system, and different cloud domains can exist on the same operating system. As described above, in contrast to the previous approaches, different customers/tenants can use the same operating system, but still be isolated from each other. Specifically, as described above, tenants within different domains can be isolated from each other. In the example of FIG. 2, two cloud domains ("IZU$A" and "IZU$B") are configured for cloud "IZU$." For cloud domain "IZU$A," tenants "Loan IYU$A01" and "New Account IYU$A02" have been configured. On the other hand, for cloud domain "IZU$B," tenants "Loan IYU$B01" and "New Account IYU$B02" have been configured.

As described above, in the multi-tenancy model, multiple tenants may use the same operating system or the same pool of system resources (such as, for example, a single hardware/memory device), while still being isolated from each other. With certain embodiments, the overall pool of system resources can be divided into smaller resource pools that can be tenant-specific or that can be shared across different tenants, depending on whether isolation between different tenants is necessary. In the multi-level hierarchy example of FIG. 2, resources can be configured to be shared across multiple tenants of the same cloud domain, while tenants within different cloud domains can be isolated from each other. For example, tenant "Loan IYU$A01" and tenant "New Account IYU$A02" (that are both within cloud domain "IZU$A") can be configured to share resources. The shared resources can be resources within resource pools 201 and 202. However, tenant "Loan IYU$A01" and tenant "Loan IYU$B01" (which belong to different cloud domains) can be configured to be isolated from each other, and thus these isolated tenants do not share resources. Tenant "Loan IYU$B01" and tenant "New Account IYU$B02" can use resource pools 203 and 204, respectively. A "resource pool" can generally be a high-level pool of computing resources that can be referenced in order to help define multi-tenant isolation scopes for shared resources within a cloud domain. The domain administrator of a specific domain can define and manage a resource pool for specific tenants and service templates.

Although certain embodiments can configure tenants in the same cloud domain to share resources from the same pool of system resources, other embodiments can also isolate tenants even when the tenants are in the same cloud domain. Tenants (within the same domain) can be isolated from each other by configuring resources pools that are tenant-specific.

Service templates can be used within cloud domains to provision software or services to tenants. Referring again to FIG. 1, cloud domain IYU$D can use one or more service templates to provision software or services for tenants IYU$DTT. When provisioning software or services using the service templates, corresponding resources can be obtained from a resource pool. The consumers/end users of tenants IYU$DTT can then use the provisioned software or services. A "consumer" can generally be a user that has been given access to tenant-specific services and resource pools. The consumer can provision service instances and can manage the life cycles of service instances. Referring to FIG. 2, example consumers include, but are not limited to, "Joe," "Gary," "Jeff," and "John."

If a service is provisioned for the consumer/end user, embodiments can perform dynamic mapping that determines which resource pool that the resources will be obtained from, based on the consumer's relationship to the underlying tenant. Embodiments can provide a necessary flexibility and a scalability for implementing a robust multi-tenant cloud platform. Embodiments can also implement a security authorization method that allows efficient management of a population of landlords, domain administrators, tenants, consumers, and associated cloud services.

As described above, in FIG. 1, a landlord can manage and configure entities within group/cloud IYU$. The landlord can also access a system authorization facility (SAF) resource:
<zosmf-SAF-prefix>.ZOSMF.PROVISIONING.RESOURCE_MANAGEMENT.IYU$ The landlord can also create or delete domains. For example, the landlord can create/delete a cloud domain and/or create/delete a domain resource profile. The landlord can also manage domain administrators. For example, the landlord can add/connect consumers to a cloud domain by using a join authority. The landlord can also manage other systems that are available within the cloud domain. With one or more embodiments, users who correspond to landlords can create domain groups under the landlord group and can connect domain administrators.

A domain administrator can manage and configure entities within a cloud domain (such as, for example, IYU$D, where D=[0 . . . 9A . . . Z]). The domain administrator can access an SAF resource:
<zosmf-SAF-prefix>.ZOSMF.PROVISIONING.RESOURCE_MANAGEMENT.IYU$D The domain administrator can create, test, and/or manage service templates for a domain. The domain administrator can also create or delete a tenant. For example, the domain administrator can create or delete a tenant group. The domain administrator can also create or delete a tenant resource profile. The domain administrator can also add or remove a service template to/from a defined tenant group, where consumers within the defined tenant group are authorized to provision services from the service template. The domain administrator can also configure a resource pool for the template and set up an entitlement policy for a tenant group, where the entitlement policy identifies the number of service instances that can be provisioned by the tenant group. The entitlement policy can also identify how many instances each consumer can provision. The domain administrator can also manage a consumer of a tenant. A user that corresponds to a domain administrator can create tenant groups and connect tenant consumers. This ability allows domain administrators to manage service definitions in resource pools within tenants. This group structure also enables resource isolation across different domains and across various tenants.

Figure 3:
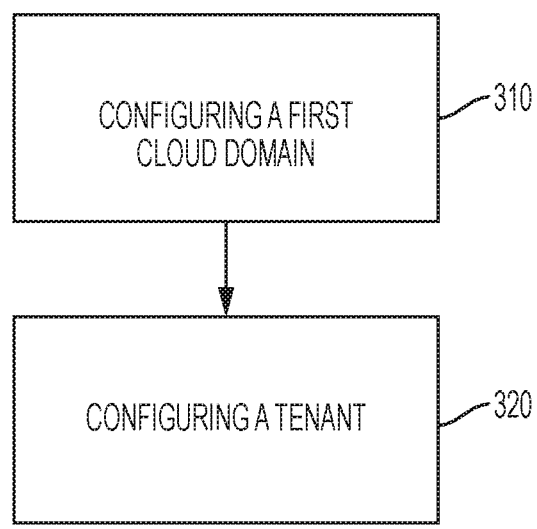
FIG. 3 depicts a flowchart of a method in accordance with one or more embodiment.

A consumer can generally manage and configure entities within group IYU$DTT, where D=[0 . . . 9 and A . . . Z], and T=[0 . . . 9 and A . . . Z]. The consumer can access an SAF resource: <zosmf-SAF-prefix>.ZOSMF.PROVISIONING.RESOURCE_MANAGEMENT.IYU$DTT FIG. 3 depicts a flowchart of a method in accordance with one or more embodiments. The method can be performed by a provisioning server, for example. In another embodiment, the method can be performed by a server or computing device of the end user, for example. The method includes, at block 310, configuring a first cloud domain. The first cloud domain and a second cloud domain use at least one of the same operating system and the same system resource pool. The method also includes, at block 320, configuring a tenant within the first cloud domain. The tenant is isolated from tenants of the second cloud domain. Resources used by the configured tenant are not shared with tenants of the second cloud domain.

Figure 4:
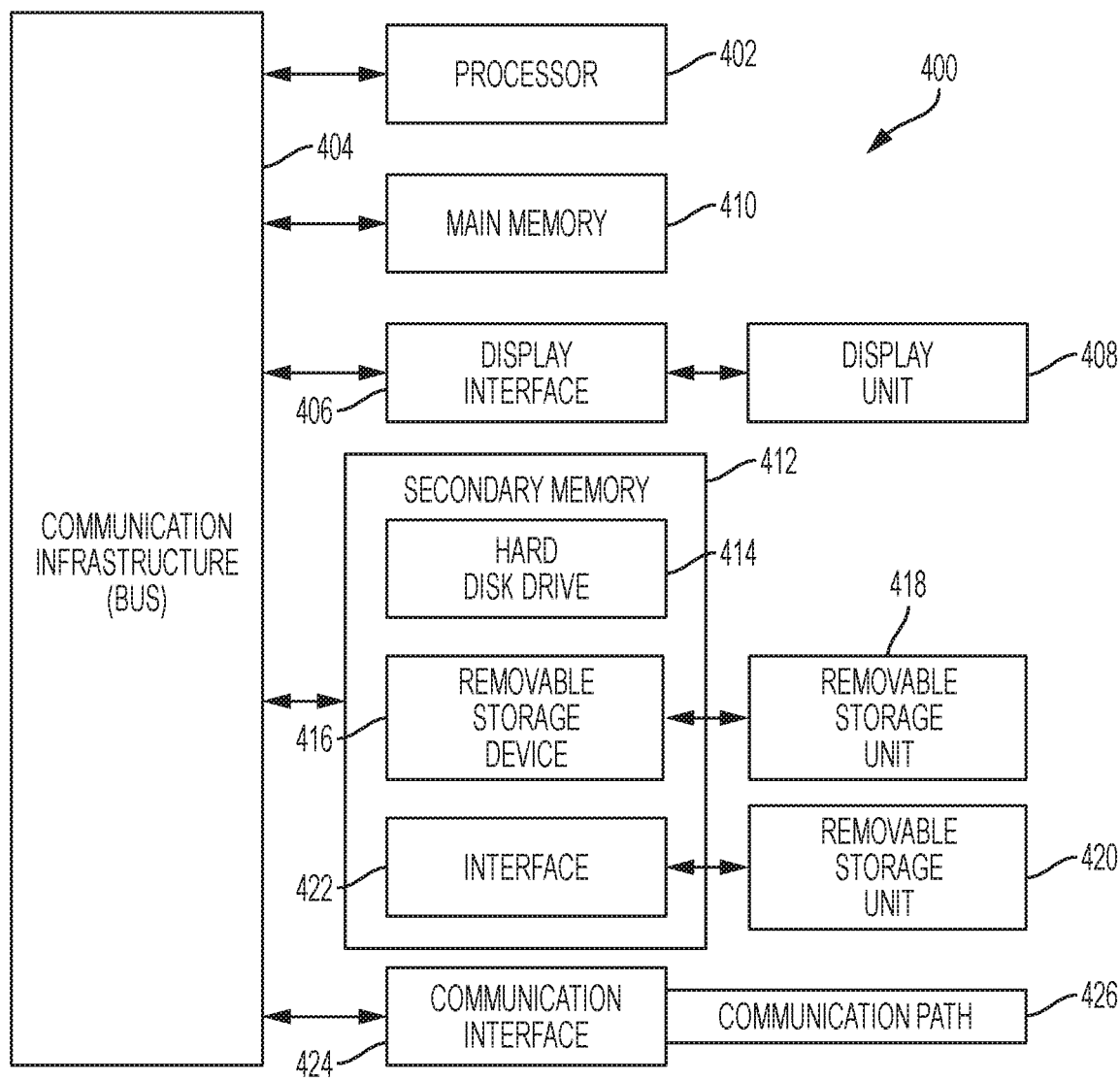
FIG. 4 depicts a high-level block diagram of a computer system, which can be used to implement one or more embodiments.

FIG. 4 depicts a high-level block diagram of a computer system 400, which can be used to implement one or more embodiments. Computer system 400 can correspond to, at least, a cloud provisioning server, a server of the end user, and/or a computing device of the end user. Computer system 400 can be used to implement hardware components of systems capable of performing methods described herein. Although one exemplary computer system 400 is shown, computer system 400 includes a communication path 426, which connects computer system 400 to additional systems (not depicted) and can include one or more wide area networks (WANs) and/or local area networks (LANs) such as the Internet, intranet(s), and/or wireless communication network(s). Computer system 400 and additional system are in communication via communication path 426, e.g., to communicate data between them.

Computer system 400 includes one or more processors, such as processor 402. Processor 402 is connected to a communication infrastructure 404 (e.g., a communications bus, cross-over bar, or network). Computer system 400 can include a display interface 406 that forwards graphics, textual content, and other data from communication infrastructure 404 (or from a frame buffer not shown) for display on a display unit 408. Computer system 400 also includes a main memory 410, preferably random access memory (RAM), and can also include a secondary memory 412. Secondary memory 412 can include, for example, a hard disk drive 414 and/or a removable storage drive 416, representing, for example, a floppy disk drive, a magnetic tape drive, or an optical disc drive. Hard disk drive 414 can be in the form of a solid state drive (SSD), a traditional magnetic disk drive, or a hybrid of the two. There also can be more than one hard disk drive 414 contained within secondary memory 412. Removable storage drive 416 reads from and/or writes to a removable storage unit 418 in a manner well known to those having ordinary skill in the art. Removable storage unit 418 represents, for example, a floppy disk, a compact disc, a magnetic tape, or an optical disc, etc. which is read by and written to by removable storage drive 416. As will be appreciated, removable storage unit 418 includes a computer-readable medium having stored therein computer software and/or data.

In alternative embodiments, secondary memory 412 can include other similar means for allowing computer programs or other instructions to be loaded into the computer system. Such means can include, for example, a removable storage unit 420 and an interface 422. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 420 and interfaces 422 which allow software and data to be transferred from the removable storage unit 420 to computer system 400.

Computer system 400 can also include a communications interface 424. Communications interface 424 allows software and data to be transferred between the computer system and external devices. Examples of communications interface 424 can include a modem, a network interface (such as an Ethernet card), a communications port, or a PC card slot and card, a universal serial bus port (USB), and the like. Software and data transferred via communications interface 424 are in the form of signals that can be, for example, electronic, electromagnetic, optical, or other signals capable of being received by communications interface 424. These signals are provided to communications interface 424 via communication path (i.e., channel) 426. Communication path 426 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 410 and secondary memory 412, removable storage drive 416, and a hard disk installed in hard disk drive 414. Computer programs (also called computer control logic) are stored in main memory 410 and/or secondary memory 412. Computer programs also can be received via communications interface 424. Such computer programs, when run, enable the computer system to perform the features discussed herein. In particular, the computer programs, when run, enable processor 402 to perform the features of the computer system. Accordingly, such computer programs represent controllers of the computer system. Thus it can be seen from the forgoing detailed description that one or more embodiments provide technical benefits and advantages.

Figure 5:
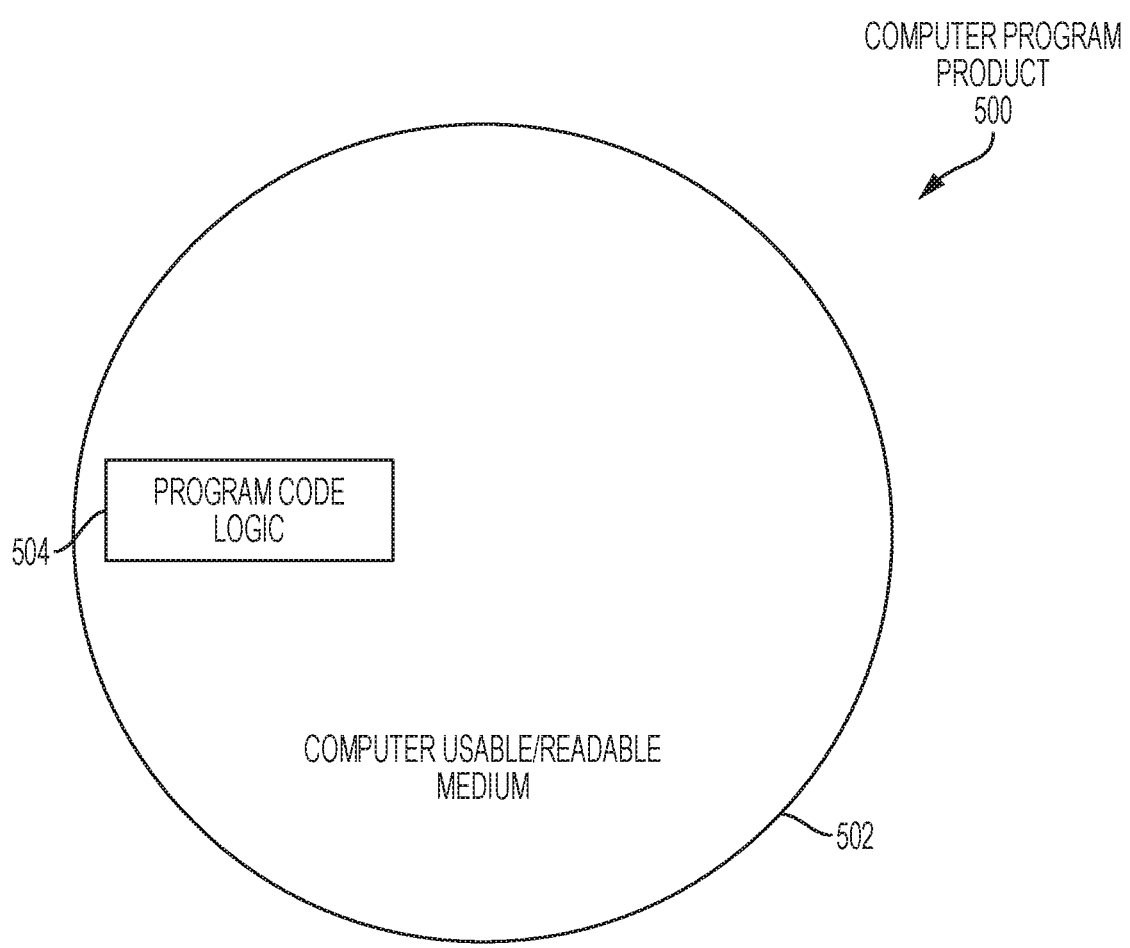
FIG. 5 depicts a computer program product, in accordance with an embodiment.

FIG. 5 depicts a computer program product 500, in accordance with an embodiment. Computer program product 500 includes a computer-readable storage medium 502 and program instructions 504.

Embodiments can be a system, a method, and/or a computer program product. The computer program product can include a computer-readable storage medium (or media) having computer-readable program instructions thereon for causing a processor to carry out aspects of one or more embodiments.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform one or more embodiments.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
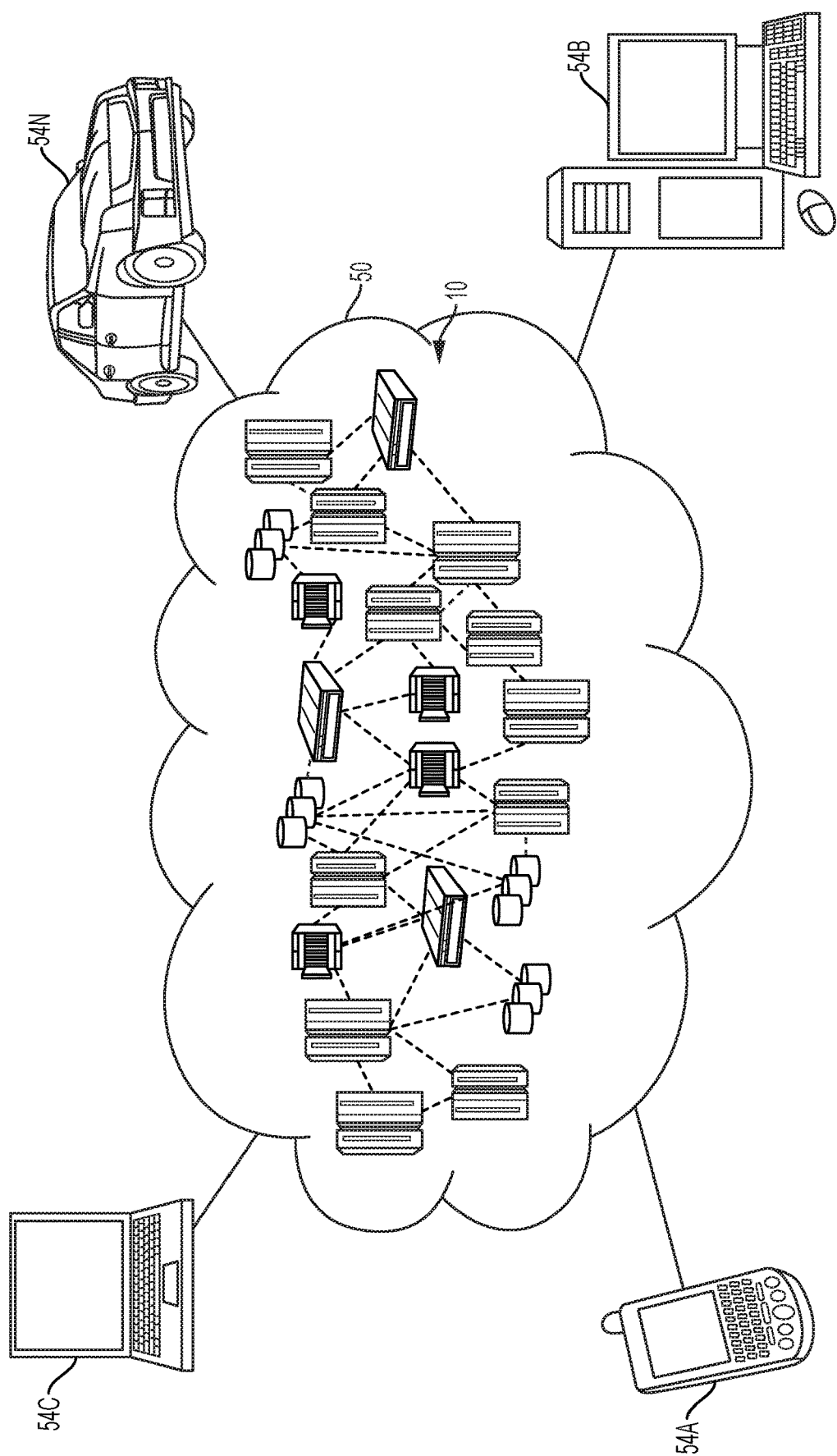
FIG. 6 depicts a cloud computing environment according to an embodiment.

FIG. 6 depicts a cloud computing environment according to an embodiment. Referring FIG. 6, illustrative cloud computing environment 50 is depicted. As described above, embodiments can be implemented within a cloud computing environment. A system (such as a provisioning server, for example) that performs the method of FIG. 3 can also be implemented within a cloud computing environment, for example. As shown, cloud computing environment 50 comprises one or more cloud computing nodes 10 with which local computing devices used by cloud consumers, such as, for example, personal digital assistant (PDA) or cellular telephone 54A, desktop computer 54B, and/or laptop computer 54C can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
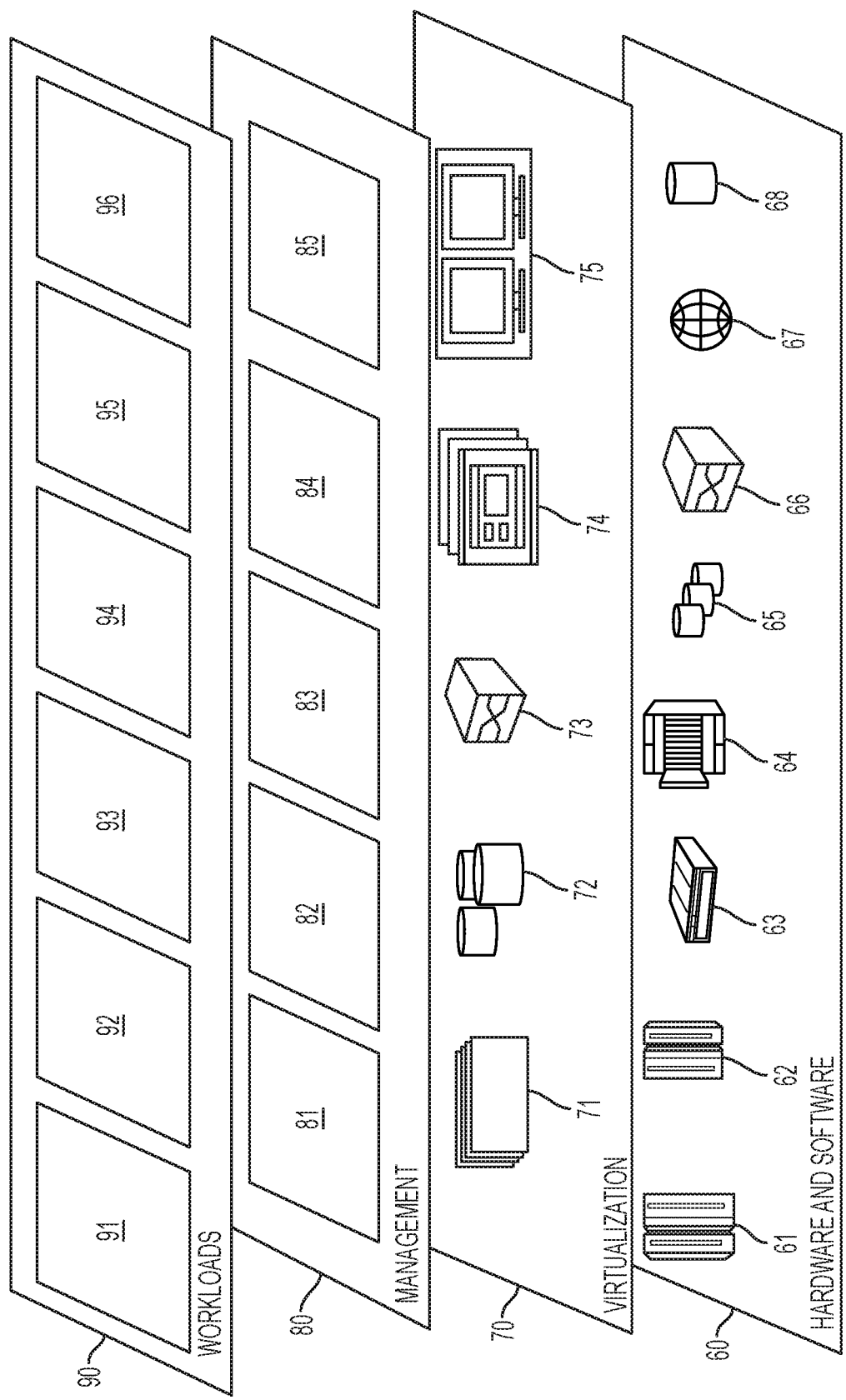
FIG. 7 depicts abstraction model layers according to an embodiment.

FIG. 7 depicts abstraction model layers according to an embodiment. Referring to FIG. 7, a set of functional abstraction layers provided by cloud computing environment 50 (FIG. 6) is shown. It should be understood in advance that the components, layers, and functions shown in FIG. 7 are intended to be illustrative only and embodiments are not limited thereto. As depicted, the following layers and corresponding functions are provided.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and configuring of cloud entities 96.

The descriptions of the various embodiments have been presented for purposes of illustration, but are not intended to be exhaustive or limited to the embodiments described. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments described herein.

What is claimed is:

1. A computer implemented method, the method comprising:
    configuring, by a cloud provisioning server, a first cloud domain, wherein the first cloud domain and a second cloud domain are implemented on a same instance of a shared operating system installed in a shared partition of hardware, wherein configuring the first cloud domain comprises automatically generating a first identifier that identifies the first cloud domain; and
    configuring a tenant within the first cloud domain, wherein the tenant is isolated from tenants of the second cloud domain by the same instance of the shared operating system, and resources used by the configured tenant are not shared with tenants of the second cloud domain, wherein configuring the tenant comprises automatically generating a second identifier that identifies the tenant, wherein the first identifier corresponds to a prefix of the second identifier and wherein the prefix comprises a cloud identifier.

2. The computer implemented method of claim 1, wherein the first identifier and the second identifier reflect a hierarchy of the first cloud domain and the tenant.

3. The computer implemented method of claim 1, wherein the resources used by the tenant within the first cloud domain are shared with other tenants of the first cloud domain.

4. The computer implemented method of claim 1, wherein the tenant within the first cloud domain is isolated from other tenants of the first cloud domain.

5. The computer implemented method of claim 1, further comprising provisioning an instance for the tenant using a service template of the first cloud domain.

6. A computer system comprising:
    a memory; and
    a processor system communicatively coupled to the memory;
    the processor system configured to perform a method comprising:
        configuring a first cloud domain, wherein the first cloud domain and a second cloud domain are implemented on a same instance of a shared operating system installed in a shared partition of hardware, wherein configuring the first cloud domain comprises automatically generating a first identifier that identifies the first cloud domain; and
        configuring a tenant within the first cloud domain, wherein the tenant is isolated from tenants of the second cloud domain by the same instance of the shared operating system, and resources used by the configured tenant are not shared with tenants of the second cloud domain, wherein configuring the tenant comprises automatically generating a second identifier that identifies the tenant, wherein the first identifier corresponds to a prefix of the second identifier and wherein the prefix comprises a cloud identifier.

7. The computer system of claim 6, wherein the first identifier and the second identifier reflect a hierarchy of the first cloud domain and the tenant.

8. The computer system of claim 6, wherein the resources used by the tenant within the first cloud domain are shared with other tenants of the first cloud domain.

9. The computer system of claim 6, wherein the tenant within the first cloud domain is isolated from other tenants of the first cloud domain.

10. The computer system of claim 6, wherein the method further comprises provisioning an instance for the tenant using a service template of the first cloud domain.

11. A computer program product comprising:
    a computer-readable storage medium having program instructions embodied therewith, wherein the computer-readable storage medium is not a transitory signal per se, the program instructions readable by a processor system to cause the processor system to perform a method comprising:
    configuring, by a cloud provisioning server, a first cloud domain, wherein the first cloud domain and a second cloud domain are implemented on a same instance of a shared operating system installed in a shared partition of hardware, wherein configuring the first cloud domain comprises automatically generating a first identifier that identifies the first cloud domain; and
    configuring a tenant within the first cloud domain, wherein the tenant is isolated from tenants of the second cloud domain by the same instance of the shared operating system, and resources used by the configured tenant are not shared with tenants of the second cloud domain, wherein configuring the tenant comprises automatically generating a second identifier that identifies the tenant, wherein the first identifier corresponds to a prefix of the second identifier and wherein the prefix comprises a cloud identifier.

12. The computer program product of claim 11, wherein the first identifier and the second identifier reflect a hierarchy of the first cloud domain and the tenant.

13. The computer program product of claim 11, wherein the resources used by the tenant within the first cloud domain are shared with other tenants of the first cloud domain.

14. The computer program product of claim 11, wherein the tenant within the first cloud domain is isolated from other tenants of the first cloud domain.

* * * * *